United States Patent [19]

Tschauner

[11] Patent Number: 5,634,489

[45] Date of Patent: Jun. 3, 1997

[54] HYDRAULIC FUSE

[75] Inventor: Tracy V. Tschauner, Yakima, Wash.

[73] Assignee: Dowty Decoto, Inc., Yakima, Wash.

[21] Appl. No.: 574,229

[22] Filed: Dec. 18, 1995

[51] Int. Cl.$^6$ ..................................... F16K 17/26
[52] U.S. Cl. .......................... 137/493.6; 137/498; 251/16
[58] Field of Search ................... 251/16, 15; 137/493.6, 137/498

[56] References Cited

U.S. PATENT DOCUMENTS

| | | |
|---|---|---|
| 4,655,245 | 4/1987 | Gellerson . |
| 4,819,688 | 4/1989 | Field ........................................ 251/16 X |
| 4,962,786 | 10/1990 | Gellerson . |

*Primary Examiner*—Kevin Lee
*Attorney, Agent, or Firm*—William W. Haefliger

[57] ABSTRACT

An improved hydraulic fuse to control hydraulic fluid flow through the fuse comprising an outer body; an annular metering body cylinder within the outer body and defining a bore, and a flow control port, whereby a flow path is defined between the outer body and the metering body cylinder and to the port; a piston slidable longitudinally in the bore to control flow through the port; first and second flow control members which are relatively slidable longitudinally in the outer body, and in the paths of fluid flow to the port, and to the piston; a threshold spring urging the first member in one direction longitudinally and a metering spring urging the second member in the opposite direction longitudinally; the members and springs cooperating to effect forward flow to the flow control port along the path as forward flow increases to level at which a portion of the flow is diverted to act on the piston, causing the piston to move toward the flow control port and to close the port.

10 Claims, 6 Drawing Sheets

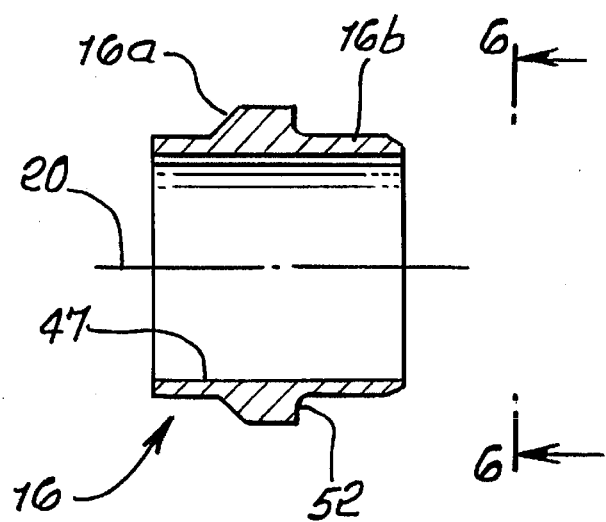
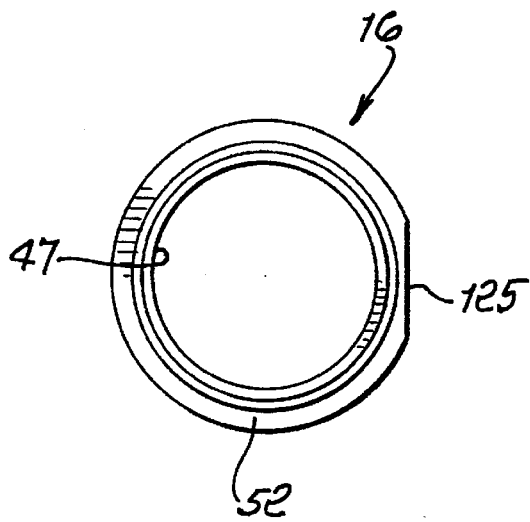
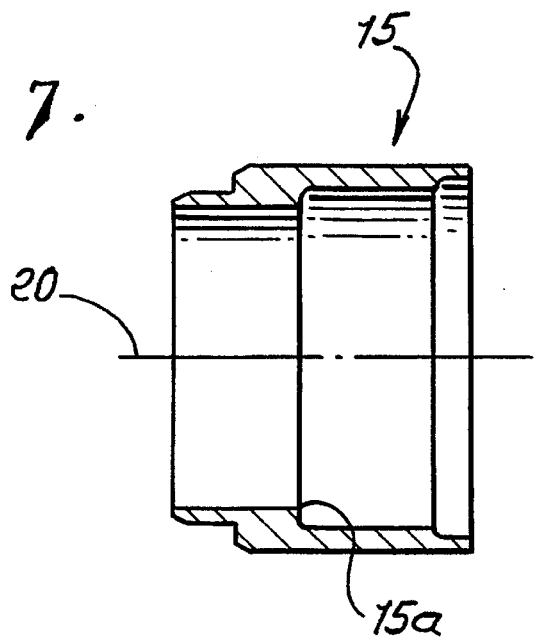

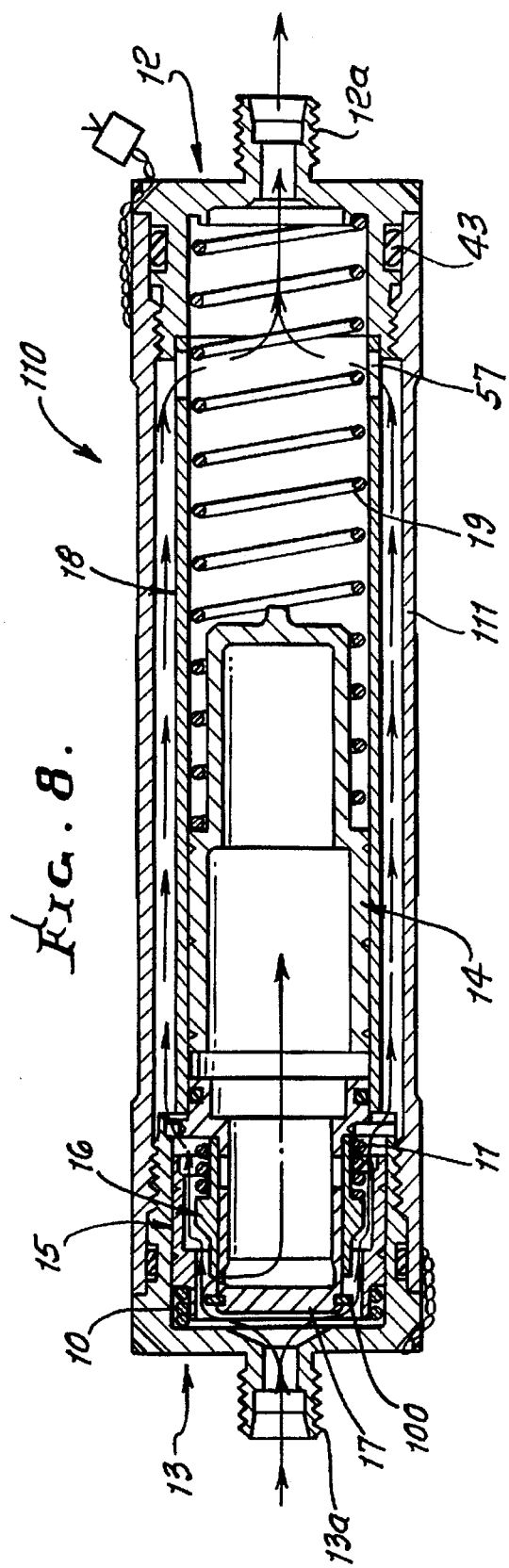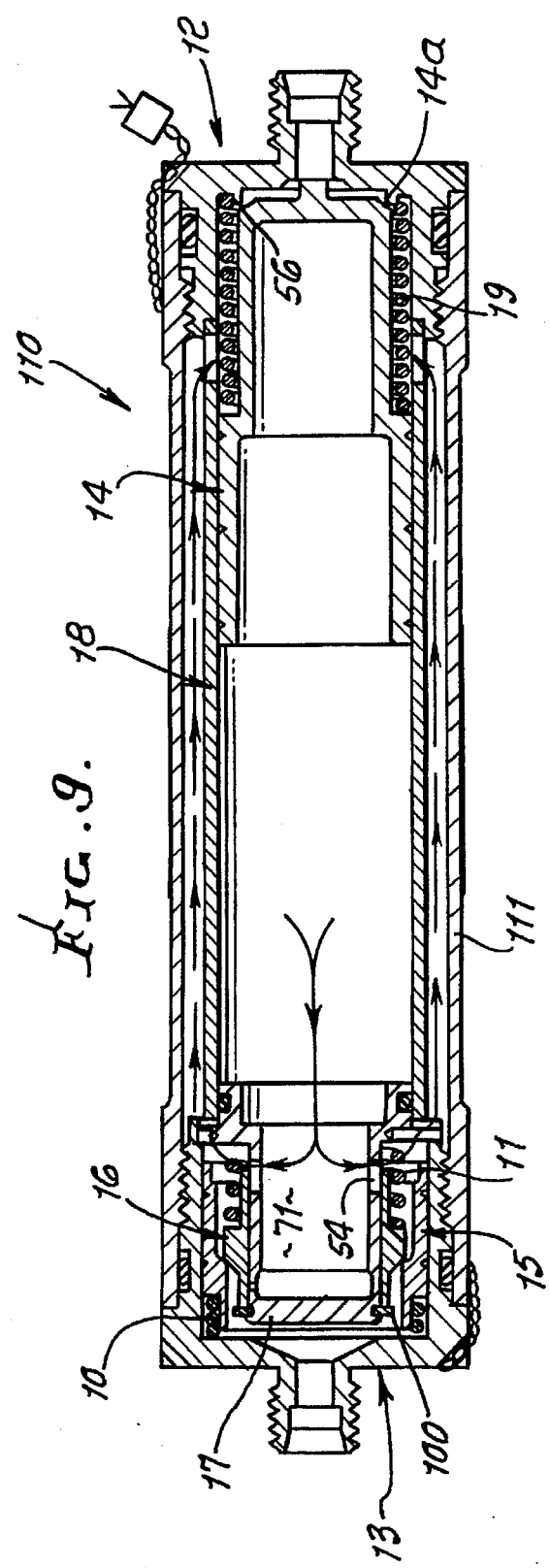

HYDRAULIC FUSE

BACKGROUND OF THE INVENTION

This invention relates generally to an improved hydraulic fuse unit to control flow of hydraulic fluid, and more particularly concerns an improved fuse unit provided with a metering valve to divide the flow into two parallel paths (metering flow and main through flow), which provides for a positive force margin across the fusing piston, and which minimizes the effects of contamination and operating atitude on fuse performance, and provides more consistent performance at low flow rates.

The fuse-assist metering piston may be devoid of seals, which allows for much more precise force margins throughout the entire range of operating flow and temperatures, and which results in more consistent volumetric capacity performance. The fuse assembly is mechanically a very simple, compact device, which requires only a minimum number of parts and is relatively easy to manufacture.

There is need for a fuse assembly having the above characteristics.

SUMMARY OF THE INVENTION

It is a major object of the invention to provide a fuse assembly meeting the above need. Basically, the improved flow controlling fuse comprises:

a) an outer body, b) an annular metering body cylinder within the outer body and defining a bore, and a flow control port, whereby a flow path is defined between the outer body and the metering body and to the port, c) a piston slidable longitudinally in the bore to control flow through the port, d) first and second flow control members which are relatively slidable longitudinally in the outer body, and in the paths of fluid flow to the port, and to the piston, e) a threshold spring urging the first member in one direction longitudinally and a metering spring urging the second member in the opposite direction longitudinally, f) the members and springs cooperating to effect forward flow to the flow control port along a first flow path as forward flow increases to level at which a portion of the flow is diverted to a second flow path to act on the piston, causing the piston to move toward the flow control port and to close the port.

It is another object of the invention to provide a fuse unit wherein the first and second members are relatively slidable sleeves having cooperating flow control surfaces, one of which is conical.

A further object is to provide a compact fuse assembly wherein the annular metering body cylinder has a reduced diameter cylindrical portion, the first and second flow control members located outwardly of the reduced diameter cylindrical portion. As will appear, a metering port is provided through the reduced diameter cylindrical portion controlled by the second member, whereby the metering port is open to a path to the piston when the members have been displaced axially by the forward flow to compress the metering spring. Also, a tubular plug may be telescopically connected to the outer body, which is also cylindrical, and the flow control members and the threshold spring and metering spring are compactly located within the plug. Assembly of the plug to the outer body establishes the operating parameters of the two slidable members.

Yet another object is to provide an interior chamber within the metering body cylinder, and to which fluid flows toward the piston, along second flow path, the flow control members having an alternate position in which forward flow of fluid is blocked, and flow of fluid is enabled from the interior chamber reversely along the second flow path to the first flow path, whereby the piston may reset by travel away from the flow port. A spring may be located within the metering body to urge the piston in a reset direction away from the flow control port.

A further object is to provide for an alternate position of the flow control members in which reverse flow of fluid through the fuse is enabled, the members displaced relatively away from the flow port and separated by the reverse flow.

These and other objects and advantages of the invention, as well as the details of an illustrative embodiment, will be more fully understood from the following specification and drawings, in which:

DRAWING DESCRIPTION

FIG. 5 is an enlarged axial section taken through a metering cone incorporated in the fuse;

FIG. 6 is an end view taken on lines 6—6 of FIG. 5;

FIG. 7 is an enlarged axial section taken through a reverse flow slide;

FIG. 8 is a schematic view of forward flow through the fuse;

FIG. 9 is a schematic view showing the unit in shutoff position, ready for reset mode.

DETAILED DESCRIPTION

Figure 1:
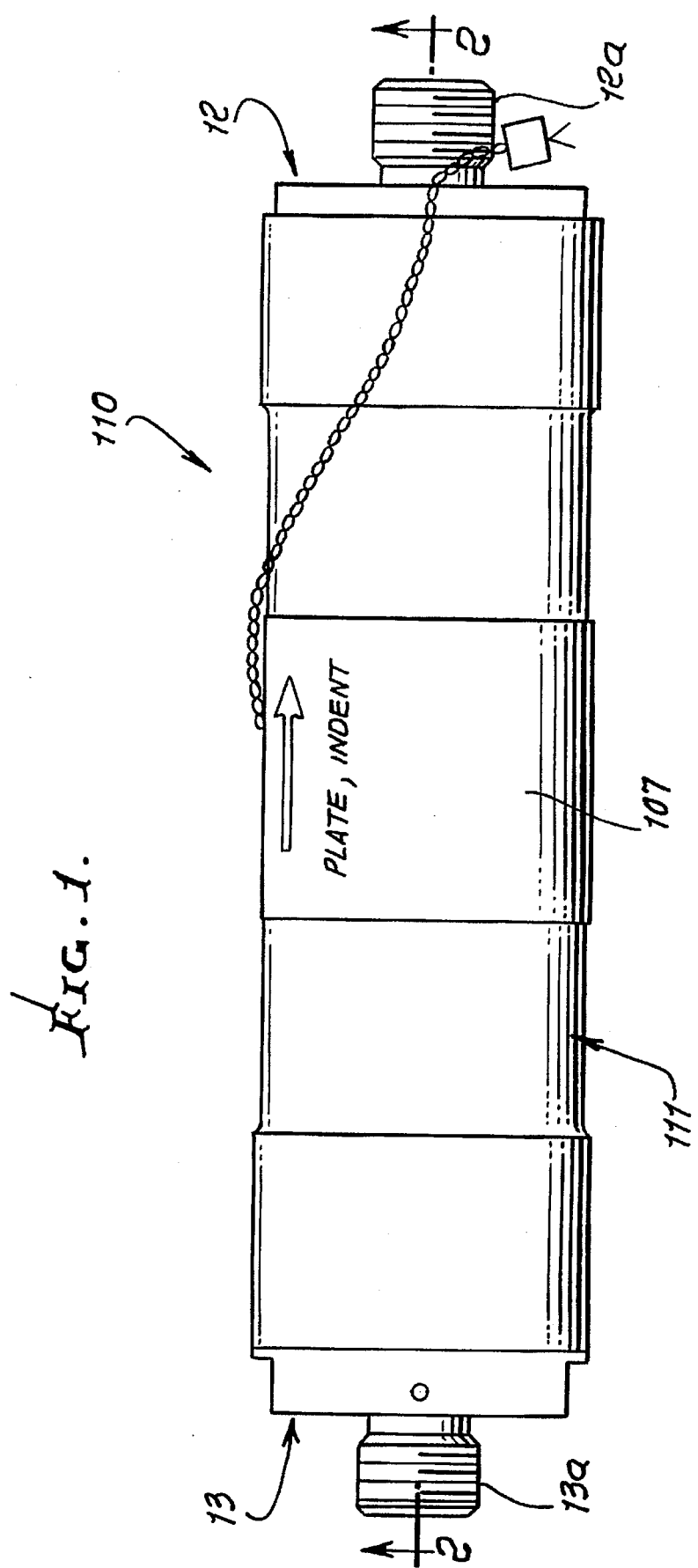
FIG. 1 is an external view of the hydraulic fuse.
Figure 2:
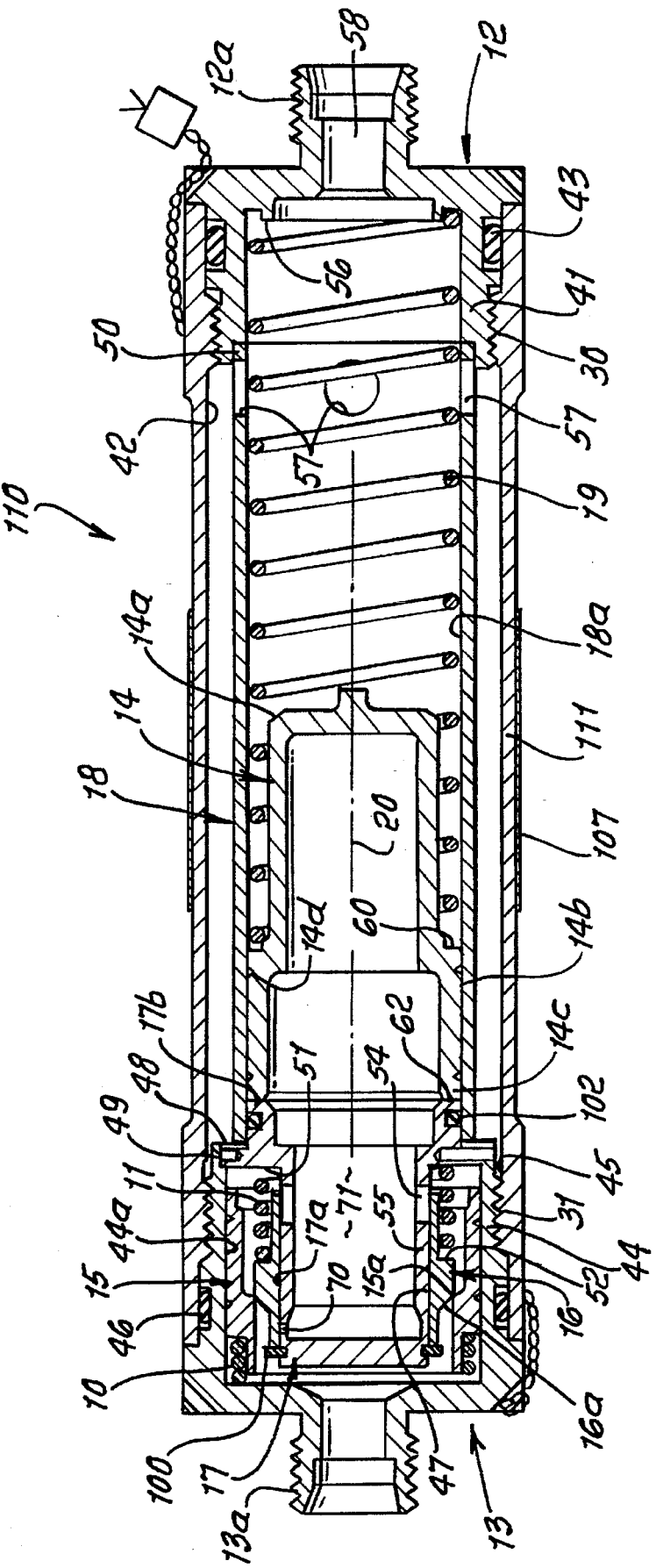
FIG. 2 is an axial section taken on lines 2—2 of FIG. 1.

Referring first to FIGS. 1 and 2, the fuse or fuse assembly 110 includes a cylindrical housing 111, an outlet plug 12 assembled to the right end of the housing, and an inlet plug 13 assembled to the left end of the housing, as shown. Threading at 30 interconnects the sleeve 41 of plug 12 to the bore 42 of the housing, there being an annular seal 43 between the sleeve and bore. Likewise, threading at 31 interconnects the sleeve 44 of plug 13 to the housing bore at 45, and an annular seal 46 seals off between sleeve 44 and the bore 45. Plugs 12 and 13 are annular, as indicated, and have end projections at 12a and 13a, to receive connectors and make-up torque applications. Elements 111, 12 and 13 define longitudinal axis 20.

Sleeve 44 has an axially extending bore 44a for slidably guiding axial movement of an annular slide 15, sometimes designated as a reverse flow slide, also shown in FIG. 7. Reverse flow control compression spring 10 is located between inner end wall of plug 13 and the slide to urge the slide axially to the right. Slide 15 is annular in shape, and coaxial with axis 20.

Figure 3:
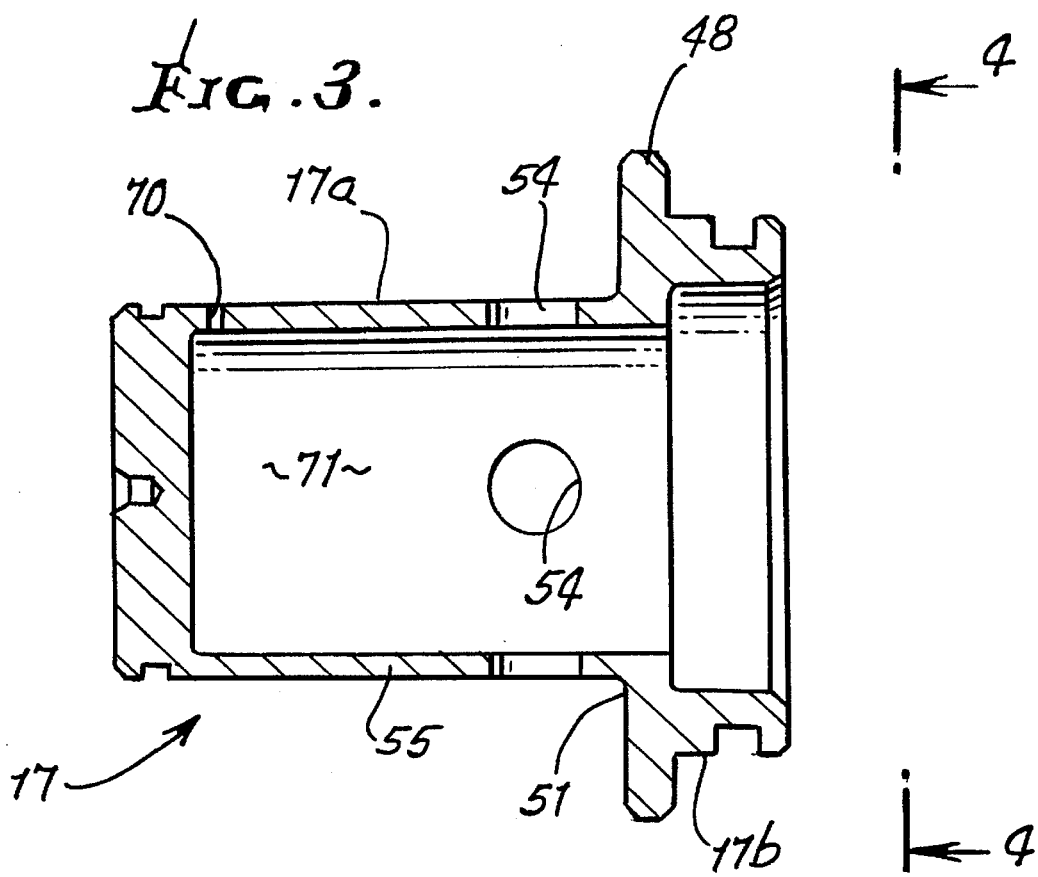
FIG. 3 is an enlarged axial section taken through a metering body incorporated in the fuse.
Figure 4:
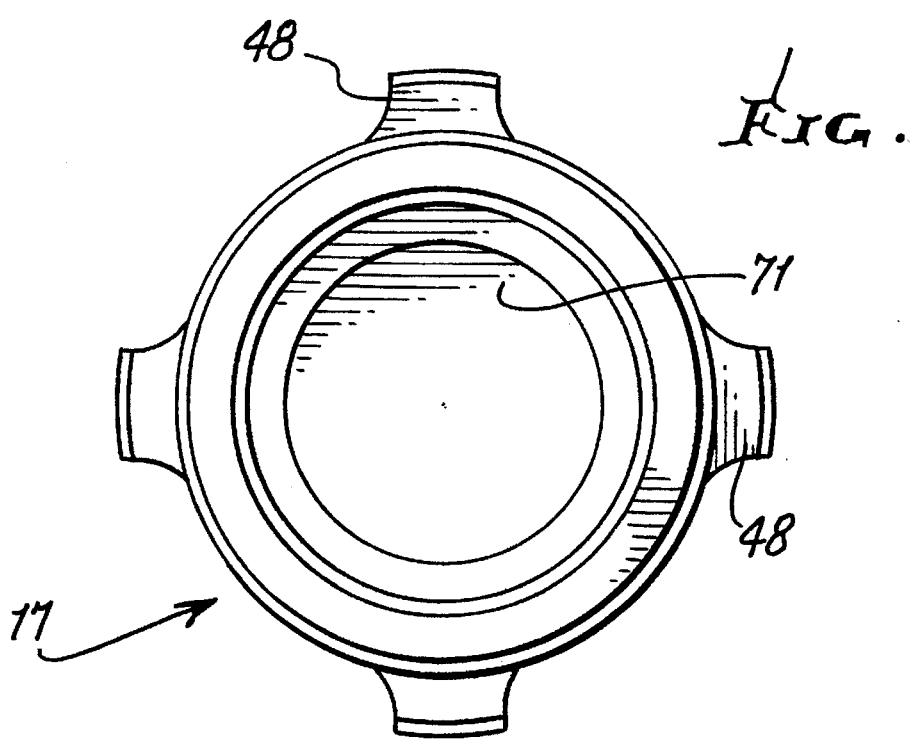
FIG. 4 is an end view taken on lines 4—4 of FIG. 3.

Located radially inwardly of the slide 15 is an annular metering cone 16, which is also annular and coaxial with axis 20. See also FIGS. 5 and 6. It defines a leftward facing conical surface 16a that tapers to the left, as shown, for engagement with annular edge or lip 15a of the slide. The cone 16 has an axially extending bore 47 that is slidably engageable with the cylindrical outer surface 17a of a metering body 17, also shown in FIGS. 3 and 4. Body 17 is positioned coaxially in the housing, as by centering of the peripheries of body flanges 48 by the bore of an inner flange 49 integral with the inlet plug. A body cylinder 18 fits over the tubular end 17b of body 17, and extends coaxially rightwardly to interfit the plug 12 at 50, whereby the body 17 and cylinder 18 are positioned coaxially in the fuse assembly.

A metering spring 11 is located between leftward facing shoulder 51 on the body 11, the rightward facing shoulder 52 on the cone 16, for urging that cone leftwardly, toward bottoming retaining ring 100, carried on the metering body. Note that cone 16 has a sleeve portion 16b that extends over, or overlaps, to the extent shown, radially extending through openings 54 (i.e., reset holes) in the cylindrical wall 55 of the metering body 17. Upon sufficient rightward movement of the cone 16, the openings 54 are closed off, i.e., blanked.

Located within the bore 18a of the metering cylinder 18 is a piston 14 that is movable axially between its extreme leftward position, as shown in FIG. 2, and a rightward position, in which the beveled rightward end 14a of the piston engages annular edge 56 of plug 12, to close off flow between radially extending through ports 57 in the rightward end of cylinder 18 and the end port 58 in the plug 12.

A compression-type piston spring 19 is located within the cylinder 18, and engages the piston at 60, to urge it axially leftwardly. The piston exterior wall section 14b slidably engages the bore 18a as the piston moves axially. Leftward end 14c of the piston engages a shoulder 62 on the metering body 17, to limit leftward travel of the piston. No seals are required between the piston bore 18a. Labyrinth grooves are provided at 14d. Annular seal 102 seals off between 17 and 18, as shown. See also identification plate 107 in FIG. 1.

OPERATION

No Flow Position

When fluid is not flowing through the unit and the piston 14 is fully reset, i.e., in FIG. 2 position, the metering cone 16 is forced against the retaining ring 100 by the metering spring, and the reverse flow slide 15 is forced against lip 15a of the metering cone, as shown, by the reverse flow spring. Also, the piston 14 is forced against the metering body 17 by the piston spring 19.

Threshold Flow Transition Positions

A volumetric fuse generally has a certain threshold flow below which the unit will not shut off the flow of fluid, regardless of the amount of flow volume that passes through it. As flow increases above this lower threshold value, the unit may or may not shut off fluid flow until the upper threshold value is reached, at which time the unit must shut off flow within the specified volume limits.

As flow begins, fluid flows through the notch or flat 125 (see FIG. 6) machined on the outer diameter of the metering cone. This is the only available flow path, since the metering cone 16 and reverse flow slide 15 are seated together around the rest of the outer edge of the metering cone, and there is very little clearance between the inlet plug and reverse flow slide. Fluid flow continues past the metering cone and metering body, then between the housing and metering cylinder, through the four large holes 57 in the end of the metering cylinder, and finally exits the unit through the outlet plug. See in this regard, the flow arrows in the schematic of FIG. 8. At these low flows, fluid flow does not enter the fluid collection cavity 71 through the reset holes 54 in the metering body and cause the piston to move to the right, as there is not sufficient delta pressure across the piston to overcome the force of the piston spring 19 acting on the piston.

As the flow rate is increased, the delta pressure that is acting on the reverse flow slide 15 and metering cone 16 also increases. This delta pressure, along with help of the reverse flow spring 10, act to compress the metering spring 11, and the reverse flow slide and metering cone begin to move. With this rightward movement, the metering cone closes off the four large reset holes 54 in the metering body, and the reverse flow slide bottoms at shoulder 51 on the metering body. The flow rate at which the reverse flow slide rightwardly bottoms on the metering body is somewhere between the lower and upper threshold limits.

When the reverse flow slide has bottomed on the metering body, the metering cone has covered the reset holes 54 and begins to uncover a small metering hole 70 in the metering body. As flow rate increases after the reverse slide is bottomed on the metering body, delta pressure increases across the metering cone, resulting in sufficient delta pressure to move the piston with flow through the metering hole 70, into cavity 71, to which the leftward end of the piston is exposed. The effect of the orifice 125 machined in the outer diameter of the metering cone is that a specific flow rate (somewhere between the lower and upper threshold limits) is required to generate a sufficient delta pressure to fully move the piston to the rightward shutoff position.

Fusing Flow Position

When the reverse flow slide 15 bottoms rightwardly on the metering body, and the metering cone 16 may or may not (depending upon flow rate) begin to move off its seated position on the reverse flow slide, the unit is in the fusing flow position. At the actual threshold flow rate of the unit, sufficient force exists across the piston 14 to compress the piston spring 19 and move the piston to the full shutoff position. This piston position is shown in the FIG. 9 schematic. This is accomplished by metering fluid into the fluid collection cavity 71 using the left edge of the metering cone and the small metering hole 70 in the metering body.

As the flow rate is increased above the actual threshold flow rate of the unit, the metering cone movement results only from the delta, i.e., differential, pressure acting on the metering cone itself, since the reverse flow slide is bottomed on the metering body. As the metering cone moves, it opens the thru-flow path between itself and the reverse flow slide, and the delta pressure increases in direct proportion to the metering spring rate. Since the extent of opening of the metering hole or port 70 is dependent upon the position of the metering cone, at the same time the thru-flow path is increasing, the extent of metering hole opening in the metering body is increasing, which increases the metering flow.

When the metering cone bottoms rightwardly on the metering body, both the thru-flow opening and the metering opening become fixed. This metered flow fills the fluid collection cavity 71 with the fluid and forces the piston rightwardly onto the seating area on the outlet plug, thus stopping fluid flow from the outlet of the unit. Once this occurs, the metering cone and reverse flow slide move leftwardly to the no-flow thru position, as seen in FIG. 9, since the delta pressure has been reduced to zero. The correlation between the thru-flow and metering flow throughout the entire flow range, whether the metering cone is bottomed or not, is the basis on which the fuse operates.

Fuse Resetting

During the reset mode, as seen in FIG. 9, the reverse flow slide and metering cone are in the no-flow position. When the delta pressure is lowered below a specified, i.e., predetermined, value, the piston spring 19 forces the piston leftwardly off the outlet plug as fluid is pushed to the left by the piston toward cavity 71 and exits the four large reset holes 54 in the metering body and back around to the back side of the piston, until the piston bottoms on the metering body at which time the unit is completely reset. See flow arrows in FIG. 9.

Reverse Flow Position

Figure 10:
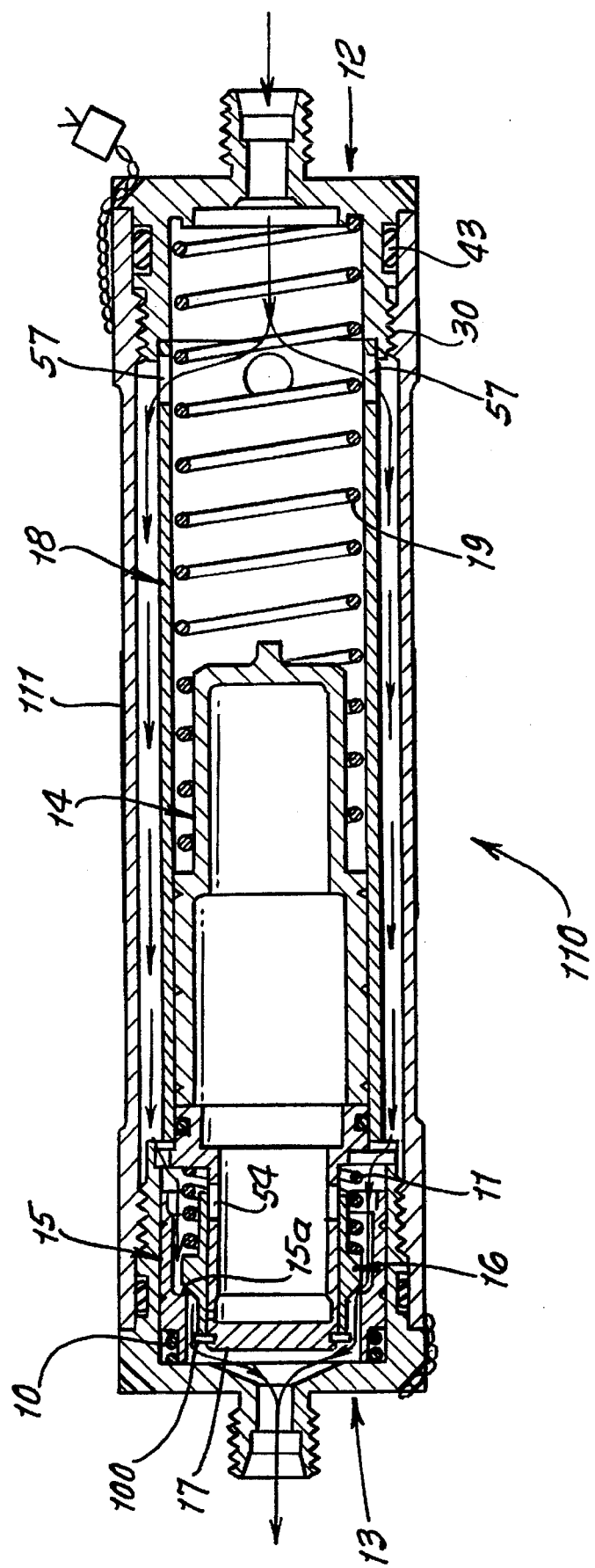
FIG. 10 is a schematic view showing the unit in reverse flow mode.

When reverse flow is applied to the fuse, as seen in the FIG. 10 schematic, the metering cone 16 is in the no-flow position and the piston can be at any position except seated on the outlet plug. Differential pressure forces the piston to bottom on the metering body, and pressure of the reverse flow causes the reverse flow slide to move to the left and compress the reverse flow spring 10, which opens the reverse flow path through the unit between the reverse flow slide and the metering cone.

It will be noted that the metering piston 14 is devoid of seals, allowing for more precise force margins throughout the entire range of operating flows and temperatures. A very compact and reliable fuse device is provided by the invention. Consistent fusing volumes from −65° F. to +225° F. are enabled.

U.S. Pat. Nos. 4,962,786 and 4,655,245 are incorporated herein by reference.

I claim:

1. In an improved hydraulic fuse to control hydraulic fluid flow through the fuse, the combination comprising:
   a) an outer body,
   b) an annular metering body cylinder within said outer body and defining a bore, and a flow control port, a first flow path is defined between the outer body and the metering body cylinder and to said port,
   c) a piston slidable longitudinally in said bore to control flow through said port,
   d) first and second flow control members which are relatively slidable longitudinally in said outer body, and in the path of fluid flow to said port, and to said piston, said path including said first flow path,
   e) a threshold spring urging said first member in one direction longitudinally and a metering spring urging the second member in the opposite direction longitudinally,
   f) said members and springs cooperating to effect forward flow to said flow control port along said first flow path as forward flow increases to a level at which a portion of the flow is diverted to a second flow path to act on the piston, causing the piston to move toward the flow control port and to close said port,
   g) said first and second members being relatively slidable sleeves having cooperating flow control surfaces, one of which is conical,
   h) and said metering body cylinder defining an interior chamber to which fluid flows to act on the piston, said flow control members have an alternate position in which forward flow of fluid is blocked, and flow of fluid is enabled from said interior chamber reversely along said second flow path, whereby the piston may reset by travel away from said flow port.

2. The combination of claim 1 wherein said metering body cylinder has a reduced diameter cylindrical portion, said first and second flow control members located outwardly of said reduced diameter cylindrical portion.

3. The combination of claim 1 including a spring within an extension of said metering body cylinder and urging said piston in a reset direction away from the flow control port.

4. The combination of claim 1 wherein said flow control members have an alternate position in which reverse flow of fluid through the fuse is enabled, said members displaced relatively away from the flow port and separated by said reverse flow.

5. The combination of claim 1 wherein said conical surface tapers axially toward an inlet defined by a plug that receives said members.

6. In an improved hydraulic fuse to control hydraulic fluid flow through the fuse, the combination comprising:
   a) an outer body,
   b) an annular metering body cylinder within said outer body and defining a bore, and a flow control port, a first flow path is defined between the outer body and the metering body cylinder and to said port,
   c) a piston slidable longitudinally in said bore to control flow through said port,
   d) first and second flow control members which are relatively slidable longitudinally in said outer body, and in the path of fluid flow to said port, and to said piston, said path including said first flow path,
   e) a threshold spring urging said first member in one direction longitudinally and a metering spring urging the second member in the opposite direction longitudinally,
   f) said members and springs cooperating to effect forward flow to said flow control port along said first flow path as forward flow increases to a level at which a portion of the flow is diverted to a second flow path to act on the piston, causing the piston to move toward the flow control port and to close said port,
   g) said metering body having a reduced diameter cylindrical portion, said first and second flow control members located outwardly of said reduced diameter cylindrical portion,
   h) and including a metering port through said reduced diameter cylindrical portion controlled by said second member, whereby said metering port is open to said second flow path to the piston when said members have been displaced axially by the forward flow to compress said metering spring.

7. The combination of claim 6 including a small metering hole through said reduced diameter cylindrical portion and at the side of a cone defined by one of said members, which is remote from said metering port.

8. In an improved hydraulic fuse to control hydraulic fluid flow through the fuse, the combination comprising:
   a) an outer body,
   b) an annular metering body cylinder within said outer body and defining a bore, and a flow control port, a first flow path is defined between the outer body and the metering body cylinder and to said port,
   c) a piston slidable longitudinally in said bore to control flow through said port,
   d) first and second flow control members which are relatively slidable longitudinally in said outer body, and in the path of fluid flow to said port, and to said piston, said path including said first flow path,
   e) a threshold spring urging said first member in one direction longitudinally and a metering spring urging the second member in the opposite direction longitudinally, f) said members and springs cooperating to effect forward flow to said flow control port along said first flow path as forward flow increases to a level at which a portion of the flow is diverted to a second flow path to act on the piston, causing the piston to move toward the flow control port and to close said port, g) and including a tubular plug telescopically connected to said outer body, which is also annular, said flow control members and said threshold spring and metering spring located within said plug.

9. The combination of claim 8 wherein said metering body cylinder has a reduced diameter cylindrical portion, said first and second flow control members located outwardly of said reduced diameter cylindrical portion.

10. In an improved hydraulic fuse to control hydraulic fluid flow through the fuse, the combination comprising:

a) an outer body, b) an annular metering body cylinder within said outer body and defining a bore, and a flow control port, whereby a first flow path is defined between the outer body and the metering body cylinder and to said port, c) a piston slidable longitudinally in said bore to control flow through said port, d) first and second flow control members which are relatively slidable longitudinally in said outer body, and in the path of fluid flow to said port, and to said piston, said path including said first flow path, e) a threshold spring urging said first member in one direction longitudinally and a metering spring urging the second member in the opposite direction longitudinally, f) said members and springs cooperating to effect forward flow to said flow control port along said first flow path as forward flow increases to a level at which a portion of the flow is diverted to a second flow path to act on the piston, causing the piston to move toward the flow control port and to close said port, g) said first and second members being relatively slidable sleeves having cooperating flow control surfaces, one of which is conical, h) said conical surface tapering axially toward an inlet defined by a plug that receives said members, i) and said conical surface being interrupted by a notch which is not blanked when said conical surface engages a lip defined by the other of said members.

* * * * *